UNITED STATES PATENT OFFICE.

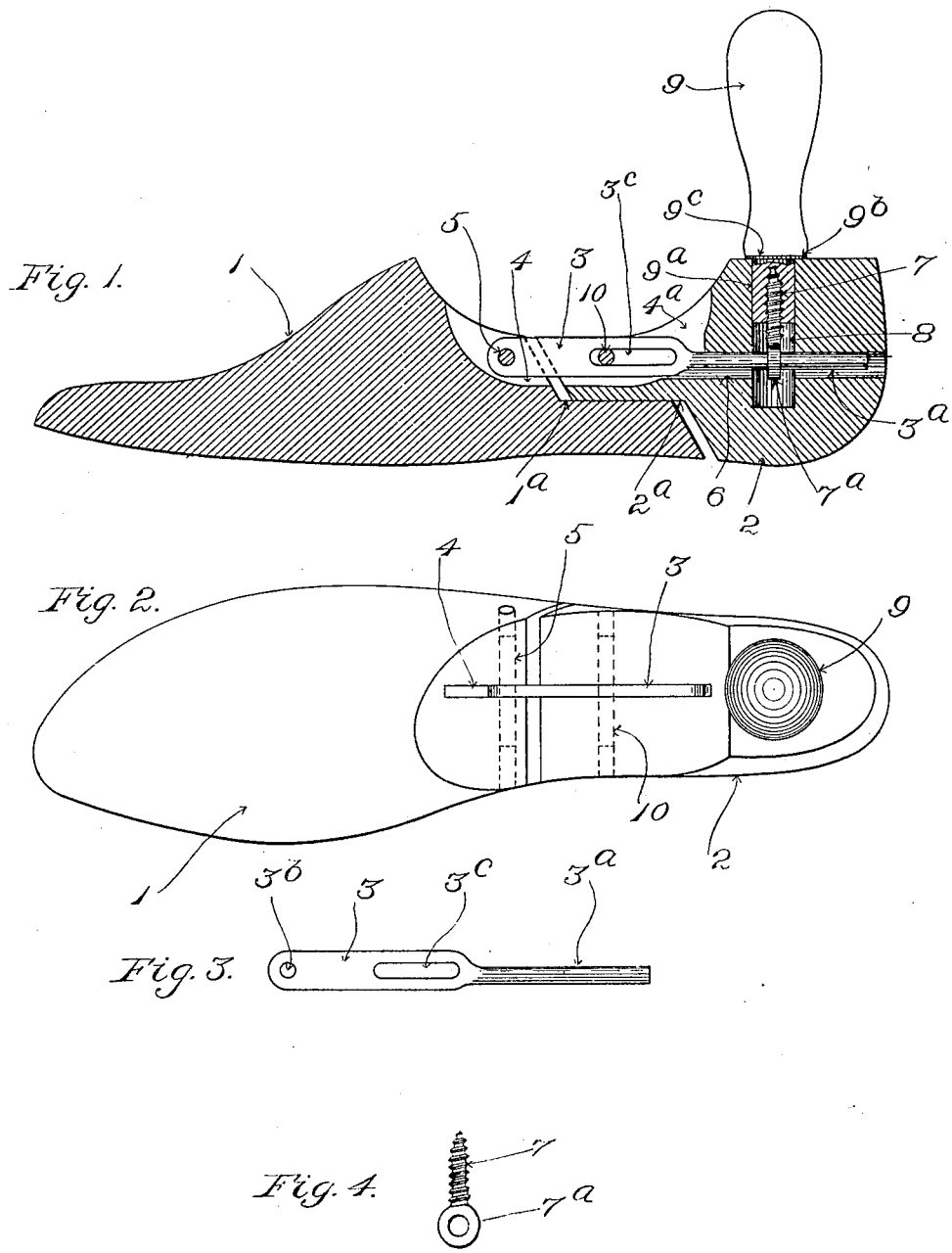

STEPHEN M. HAMBLIN, OF WALPOLE, MASSACHUSETTS, ASSIGNOR TO BAY STATE LAST COMPANY, OF WALPOLE, MASSACHUSETTS, A CORPORATION OF MASSACHUSETTS.

SHOE TREE OR FORM.

No. 904,775.            Specification of Letters Patent.           Patented Nov. 24, 1908.

Application filed June 3, 1908. Serial No. 436,380.

*To all whom it may concern:*

Be it known that I, STEPHEN M. HAMBLIN, a citizen of the United States, residing at Walpole, in the county of Norfolk, State of Massachusetts, have invented a certain new and useful Improvement in Shoe Trees or Forms, of which the following is a specification, reference being had therein to the accompanying drawings.

The invention presents a shoe-tree or form of novel and improved character which is conveniently and readily adjustable in length to fit the shoe into which it is inserted, as well as to enable it to be shortened to facilitate insertion and removal and in addition avoid rubbing the shoe-lining during such operations, and to be extended to fill the shoe lengthwise when in place within the latter.

The invention is embodied in a shoe-tree or form comprising, essentially, a fore-part and a heel-part which are divided or separated from each other, a connecting link having a flattened body-portion working in vertical slots in said fore-part and heel-part, pivoted at its forward end within the slot in the fore-part, and having a smooth extension (preferably rounded) passing rearward into the heel-part, a vertically-movable bolt working in a hole in the heel-part and having an eye through which the said extension projects, and a handle for the tree or form, serving as a nut which fits the threaded stem of the bolt, and which operates the latter to clamp the said extension for the purpose of holding the tree or form in its adjusted length. The smooth extension of the link, which constitutes an important feature of the invention, is adapted to be clamped by the eye of the said bolt at any point in its length, permitting a very fine or close adjustment of the length of the tree or form. The fore-part is formed at its rear end with a horizontal platform, constituting another important feature of the invention, on which rests a forwardly-projecting portion of the heel-part having a horizontal under surface, whereby the heel-part is supported in all positions of adjustment, and prevented from dropping relative to the fore-part in any of such positions. Thereby the bottom of the heel-part is prevented from descending out of alinement with that of the fore-part.

The invention is illustrated in the drawings, in which latter,—

Figure 1 shows in vertical longitudinal section a shoe-tree or form embodying the invention. Fig. 2 is a plan thereof. Fig. 3 shows the link in side elevation, separately. Fig. 4 is an elevation of the clamping screw, separately.

Having reference to the drawings,—The fore-part of the tree or form shown therein is designated 1, the heel-part being marked 2. At 3 is the link, $3^a$ being its extension. 4, $4^a$, are the vertical slots in the top-portions of the fore-part and heel-part in which the body-portion of the said link is received, 5 being the pin which pivotally connects the forward end of the link to the fore-part, the said pin passing transversely through the wood of the fore-part and also through a hole $3^b$ which is made in the said forward end. A hole 6 bored in the rear portion of the heel-part, in the direction from rear to front, receives the extension $3^a$ of the link 3. At 7 is the clamping-bolt, and $7^a$ is its eye through which the extension of the link passes. The body-portion of the said bolt extends upward within the vertical hole 8 that is made in the upper portion of the heel-part, such hole intersecting the hole 6. The handle of the tree or form is shown at 9, it being made of either wood or metal as deemed desirable, and having the cylindrical lower portion $9^a$ which enters the hole 8, a shoulder $9^b$ being formed on the handle to bear upon the top of the heel-part. A metal washer is shown at $9^c$, between the said shoulder and the top of the heel-part. The handle is bored and internally threaded to fit the threaded portion of clamping bolt 7. As the handle is turned in the proper direction, its shoulder being supported by the top of the heel-part, the said bolt is drawn upward, its eye pulling up the extension of the link and pressing the same against the top of the hole 6, thereby clamping the said extension against endwise movement within the said hole, and securing the tree or form in its condition of lengthwise adjustment. At 10 is a stop-pin passing transversely through the heel-part and through a slot $3^c$ in link 3. The said slot extends in the direction of the length of the link, its own length corresponding with the extreme extent of the adjustment of the tree or form that is desired, such extent being limited by contact of the pin 10 with the respective end-walls of the slot $3^c$. At $1^a$ is the horizontal platform projecting rearwardly from the fore-part, and at 2ª is the forwardly-extending horizontal surface on the heel-part that rests upon such platform. The length of slot 3ᶜ is so proportioned with respect to that of the platform 1ª, that the extension of the tree or form is arrested before the horizontal surface 2ª passes off the platform. Consequently, throughout the entire possible range of adjustment of the tree or form, the heel-part is supported by the platform from dropping. The platform operates to relieve the link, and the pins 5 and 10 with which the latter engages, from vertical strain, and by preventing the heel-part from dropping, as aforesaid, it keeps the bottom of the heel-part, and that of the fore-part, in proper horizontal alinement even when the tree or form is extended to its fullest capacity.

I claim as my invention:—

1. In a tree or form, in combination, the fore-part having the rearwardly-extending platform, the heel-part having the horizontal surface which rests upon such platform and slides thereon in the adjustment of the tree or form in length, and whereby the heel-part is supported, in the various positions of adjustment, the link pivoted by its front end to the fore-part and having the extension, and a clamping device having an eye through which such extension passes.

2. In a tree or form, in combination, the fore-part, the heel-part, the link pivoted to the fore-part and having the smooth rearward extension, the clamping-screw having the eye through which the said extension passes, and the handle screwing on to the threaded portion of such screw.

3. In a tree or form, in combination, the fore-part having the rearwardly-extending horizontal platform, the heel-part having the horizontal surface which rests upon the said platform in the various positions of adjustment of the tree or form in length, the link connected with the fore-part and having the extension, and a clamping device engaging with the said extension to hold the parts in adjusted relation.

4. In a tree or form, in combination, the fore-part having the rearwardly-extending horizontal platform, the heel-part having the horizontal surface which rests upon the said platform in the various positions of adjustment of the tree or form in length, the link pivoted to the fore-part and having the smooth extension, and a clamping device engaging with the said smooth extension to hold the parts in adjusted position.

5. In a tree or form, in combination, the fore-part having the rearwardly-extending horizontal platform, the heel-part having the surface which rests upon the said platform in the various positions of adjustment of the tree or form in length, the link pivoted to the fore-part and having the smooth round extension, and a clamping device having an eye through which the said round extension passes.

6. In a tree or form, in combination, the fore-part having the rearwardly-extending horizontal platform, the heel-part having the surface which rests upon the said platform in the various positions of adjustment of the tree or form in length, the link pivoted to the fore-part and having the smooth round extension, a clamping bolt having an eye through which the said round extension passes, and an internally-threaded adjusting piece which engages the threaded portion of the said bolt.

7. In a tree or form, in combination, the fore-part having the rearwardly-extending horizontal platform, the heel-part having the surface which rests upon the said platform in the various positions of adjustment of the tree or form in length, the link pivoted to the fore-part and having a smooth extension, a vertically moving clamping-device engaging with the said extension to clamp the same and having an operating screw-thread, and a screw-threaded operating device in engagement with the said screw-thread of the clamping device.

In testimony whereof I affix my signature in presence of two witnesses.

STEPHEN M. HAMBLIN.

Witnesses:
CHAS. F. RANDALL,
WILLIAM A. COPELAND.